(12) United States Patent
Cooper

(10) Patent No.: US 7,559,334 B2
(45) Date of Patent: Jul. 14, 2009

(54) BLIND

(76) Inventor: Daniel Earl Cooper, 1715 Mims Rd., P.O. Box 114, Screven, GA (US) 31560

(*) Notice: Subject to any disclaimer, the term of this patent is extended or adjusted under 35 U.S.C. 154(b) by 52 days.

(21) Appl. No.: 11/609,942

(22) Filed: Dec. 13, 2006

(65) Prior Publication Data

US 2007/0144570 A1 Jun. 28, 2007

Related U.S. Application Data

(60) Provisional application No. 60/754,385, filed on Dec. 28, 2005.

(51) Int. Cl.
 *E04H 15/04* (2006.01)
(52) U.S. Cl. .......................... 135/90; 135/901
(58) Field of Classification Search ............ 135/90, 135/901, 94, 123, 127, 158, 115, 117; 43/1; 182/187–188
 See application file for complete search history.

(56) References Cited

U.S. PATENT DOCUMENTS

| | | | | |
|---|---|---|---|---|
| 4,458,707 A * | 7/1984 | Lindaman | ..................... | 135/90 |
| 4,505,286 A * | 3/1985 | Madion | ....................... | 135/90 |
| 5,218,982 A * | 6/1993 | Kenji | .......................... | 135/90 |
| 5,669,403 A * | 9/1997 | Belcher et al. | ................. | 135/90 |
| 5,787,914 A * | 8/1998 | Greywall | ..................... | 135/90 |
| 6,021,794 A * | 2/2000 | Guerra | ........................ | 135/95 |
| 7,182,091 B2 * | 2/2007 | Maddox | ....................... | 135/90 |
| 2002/0152665 A1 * | 10/2002 | Varnado | ........................... | 43/1 |
| 2003/0047203 A1 * | 3/2003 | Lah | ............................ | 135/114 |
| 2006/0005870 A1 * | 1/2006 | Maddox | ....................... | 135/90 |
| 2006/0200901 A1 * | 9/2006 | Beyda | ........................... | 4/558 |

OTHER PUBLICATIONS

Sky Lodge. Buddy Blind. [Online] [retrieved on Apr. 11, 2007] [retrieved from http://www.gooseview.com/deer%20river%20brand/deerriver$_{13}$ products_pages/skylodge_b...] 2 pgs.
Sky Lodge. Bowhunter. [Online] [retrieved on Apr. 11, 2007] [retrieved from http://www.gooseview.com/deer%20river%20brand/deerriver_products_pages/skylodge_b...] 2 pgs.
Sky Lodge. Treestand/Ladderstand Blind. [Online] [retrieved on Apr. 11, 2007] [retrieved from http://www.gooseview.com/deer%20river%20brand/deerriver_products_pages/skylodge.htm] 3 pgs.

* cited by examiner

*Primary Examiner*—David Dunn
*Assistant Examiner*—Danielle Jackson
(74) *Attorney, Agent, or Firm*—Adams Intellectual Property Law, P.A.

(57) ABSTRACT

A blind for concealing an individual includes an annular support, a curtain, a first securing means, and a second securing means. The curtain is suspended from the support for surrounding the individual. The first securing means secures a rear of the support to an upright object, and the second securing means secures a front of the support to the upright object at a height higher than the first securing means such that the support is suspended from the upright object in a generally horizontal position.

5 Claims, 5 Drawing Sheets

BLIND

CROSS-REFERENCE TO RELATED APPLICATIONS

This application claims the benefit of Provisional Application Ser No. 60/754,385, filed on Dec. 28, 2005.

TECHNICAL FIELD AND BACKGROUND OF THE INVENTION

The present invention relates to blinds used by hunters and wildlife observers. In particular, the invention relates to blinds mounted in trees and other vertical supports.

Hunting and wildlife observation have been a part of peoples lives for many years. When participating in these activities, it is essential to remain completely still for long periods of time to avoid alerting animals of potential danger. Due to extreme weather conditions, bugs, cramps, and pain, this can be a very daunting task. For these reasons, hunters and wildlife observers have used camouflage to obscure their presence. One effective form of camouflage is a ground blind. Ground blinds not only reduce a hunter's or wildlife observers' visibility to animals, but they also allow some freedom of movement and keep the hunter or observer sheltered from inclement weather. A good example of this can be seen in U.S. Pat. No. 6,164,005 issued to Copeland on Dec. 26, 2000.

More often than not, it is preferred by the hunters and wildlife observers to be positioned in an elevated location, allowing them to have a much broader view of the area. As a result, they will secure a tree stand to a tree or other suitable support. The tree stand allows them to sit or stand at an elevated position above the ground, providing them with a better view of the surrounding area. While the tree stand eliminates some of the disadvantages of being positioned at ground level, it does not provide concealment from animals. Thus, a hunter or wildlife observer must remain still or risk being spotted. Accordingly, it has been necessary to create tree mounted blinds such as the one disclosed in U.S. Pat. No. 5,669,403 to Belcher.

Blinds of this type have provided the hunter and observer with the ability to move as necessary and still remain concealed. However, blinds are typically made up of several components, and in some instances with components that are too large, making it hard to maintain the blind and transport it into remote areas where hunters and wildlife observers desire to enter.

Accordingly, there is a need for a blind that is convenient, compact, lightweight and easy to transport.

SUMMARY OF THE INVENTION

Therefore it is an object of the invention to provide an improved blind that is compact, lightweight, and easily transported.

It is another object of the invention to provide a blind that maybe mounted to a tree or other suitable vertical support.

It is another object of the invention to provide a blind that is easy to assemble and disassemble.

It is another object of the invention to provide a blind that provides shelter from inclement weather.

It is another object of the invention to provide a blind that provides camouflaged concealment to a hunter or observer.

It is another object of the invention to provide a blind that is safe to use.

It is another object of the invention to provide a blind that is versatile and may be used with a ladder stand, a tree climber stand, or as a ground blind.

It is another object of the invention to provide a blind that provides a full panoramic view of an observation area.

These and other objects of the present invention are achieved in the preferred embodiments disclosed below by providing a blind for concealing an individual. The blind includes an annular support; a curtain suspended from the support for surrounding the individual; a first securing means for securing a rear of the support to an upright object; and a second securing means for securing a front of the support to the upright object at a height higher than the first securing means such that the support is suspended from the upright object in a generally horizontal position.

According to another preferred embodiment of the invention, the support includes a plurality of support sections connected in an end-to-end configuration.

According to another preferred embodiment of the invention, the plurality of support sections are connected to each other by respective couplers.

According to another preferred embodiment of the invention, the support includes an elastic cord running through the plurality of support sections to maintain the support sections in the end-to-end configuration.

According to another preferred embodiment of the invention, the support forms a circular frame for suspending the curtain and allowing the curtain to surround the individual.

According to another preferred embodiment of the invention, the curtain includes a loop along a top edge of the curtain for receiving the support therethrough.

According to another preferred embodiment of the invention, the curtain includes at least one weight carried at a bottom of the curtain for maintaining the curtain in a taut condition.

According to another preferred embodiment of the invention, the curtain includes at least one window formed in an upper portion of the curtain.

According to another preferred embodiment of the invention, the at least one window includes a flap adapted to move from a closed position to an open position.

According to another preferred embodiment of the invention, the blind further includes a roof adapted to be connected to a top edge of the curtain to cover an open top of the curtain.

According to another preferred embodiment of the invention, the roof is stretched over the second securing means and around the top edge of the curtain to form a pitched surface.

According to another preferred embodiment of the invention, a blind for concealing an individual in an elevated location includes a support adapted to be formed into an annular frame; a curtain suspended from the support and adapted to surround the individual; a first securing device connected to a rear of the support for securing the rear of the support to an upright object at a first height; an attachment strap having a first end connected to a front of the support and extending therefrom to the upright object; and a second securing device connected to a second end of the attachment strap for securing the second end of the attachment strap to the upright object at a second height greater than the first height. The first securing device, second securing device, and attachment strap maintain the support in a generally horizontal position.

According to another preferred embodiment of the invention, the support includes a plurality of support sections connected to each other in an end-to-end configuration by respective couplers, and an elastic cord running through the support sections to maintain the plurality of support sections in the end-to-end configuration.

According to another preferred embodiment of the invention, a method of concealing an individual in an elevated location includes the steps of providing a blind having a support, a curtain, a first securing device, a second securing device, and an attachment strap; suspending the curtain from the support; securing a rear of the support to an upright object with the first securing device; attaching the attachment strap to a front of the support; and securing the attachment strap to the substantially vertical object with the second securing device, such that the support is maintained in a generally horizontal position.

According to another preferred embodiment of the invention, the method further includes the step of connecting opposing ends of the support together to form a circular frame.

According to another preferred embodiment of the invention, the method further includes the step of providing a roof for attachment to the curtain.

According to another preferred embodiment of the invention, the method further includes the step of stretching the roof over the attachment strap and securing the roof to a top edge of the curtain such that the roof is pitched.

BRIEF DESCRIPTION OF THE DRAWINGS

The invention may be best understood by reference to the following description in conjunction with the accompanying drawing figures in which.

DESCRIPTION OF THE PREFERRED
EMBODIMENT AND BEST MODE

Figure 1:
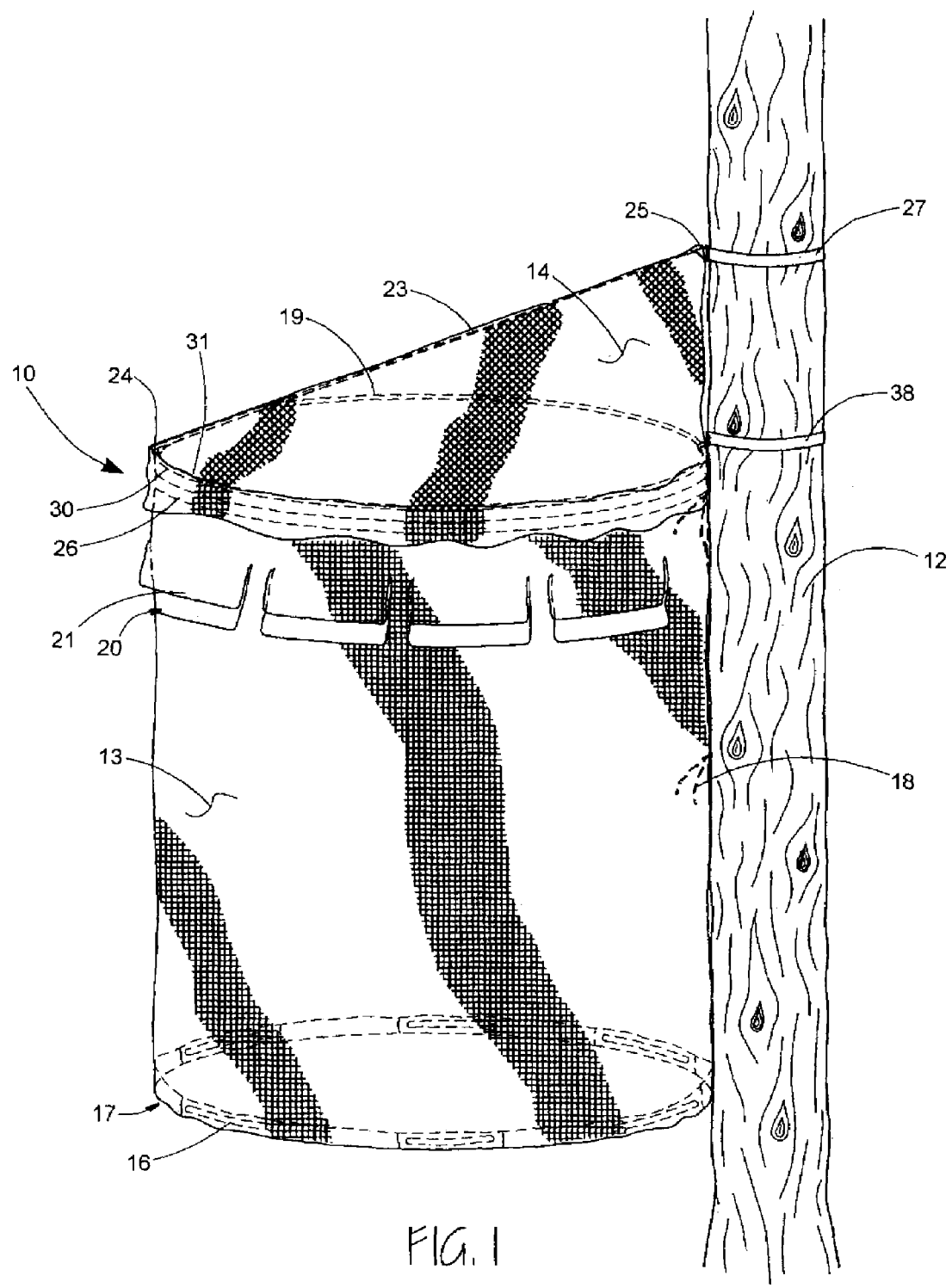
FIG. 1 is a perspective view of a blind according to an embodiment of the invention mounted to a tree.

Referring now specifically to the drawings, wherein like reference numerals refer to like parts throughout, a blind according to an embodiment of the invention is illustrated in FIG. 1 and shown generally at reference numeral 10. As illustrated, the blind 10 may be mounted to a tree 12 or other suitable support, and includes a side curtain 13 suspended vertically from a support 19 for surrounding and concealing a hunter or an observer from wildlife, and a roof 14 connected to the curtain 13 for providing additional concealment and protection from the weather. The side curtain 13 and roof 14 are preferably made of a material designed to shed water; however, any suitable material may be used to protect and conceal the observer, such as wind blocking and scent blocking material.

The curtain 13 includes a plurality of weights 16 positioned along a bottom portion 17 of the curtain 13 to maintain the curtain 13 in a taut configuration. The weights may be sewn into the bottom portion 17 or fastened thereto by any other suitable means, such as magnets, hook and loop fasteners, and snaps. Ties 18 are positioned on either end of the curtain 13 to allow opposing ends of the curtain 13 to be tied together, thereby closing a rear of the blind 10.

Windows 20 are positioned in the curtain 13 to provide a full panoramic view of the area of observation. The windows 20 may be of various sizes and positioned at various locations to allow a hunter to shoot therethrough or to accommodate various uses. The windows 20 are formed by cutting openings in the curtain 13 such that a portion of the curtain 13 is left in between each adjacent window 20 to allow for support of the bottom portion 17 of the curtain 13. As shown, the windows 20 are cut such that a flap 21 is formed to allow the window 20 to be closed. The flaps 21 may be left to move freely or may include a fastener to allow a user to secure the flaps 21 in an open or closed position.

Figure 5:
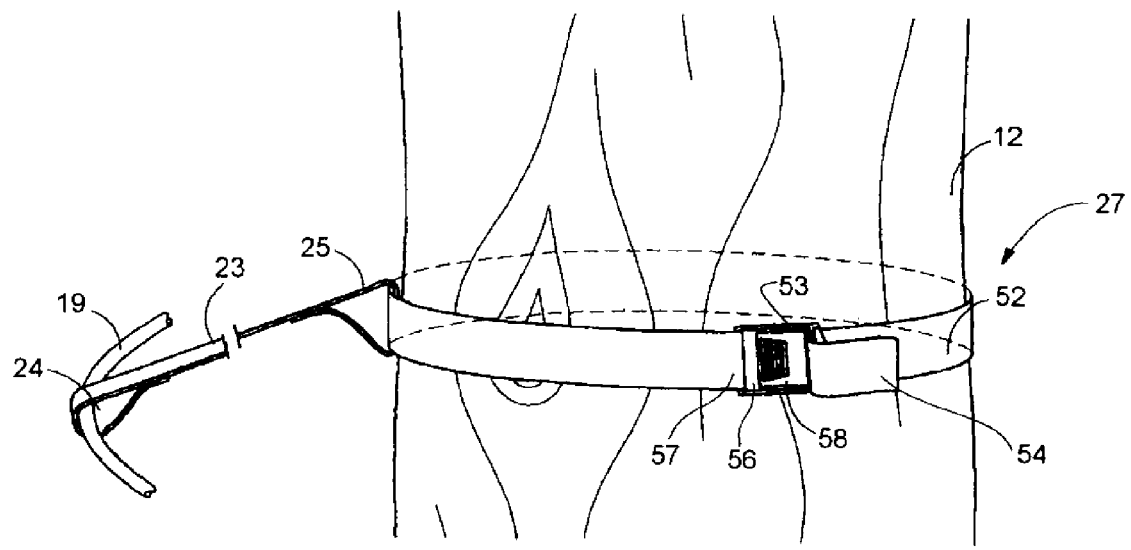
FIG. 5 is a perspective view of a lower connection mechanism of the blind of FIG. 1.

The roof 14 provides additional concealment and protection from the weather, and is stretched over an attachment strap 23 extending from the tree 12 and fastened to and around a peripheral edge of the curtain 13 by fasteners 26, such as hook and loop fasteners, buttons, and snaps. As shown in FIGS. 1 and 5, the attachment strap 23 includes loops 24 and 25 positioned on opposing ends, and extends from a front of the blind 10 to the tree 12 where it is secured to the tree 12 by a securing strap 27 that is wrapped and pulled tightly around the tree 12. In addition to supporting the roof 14, the attachment strap 23 supports a front of the blind 10.

Figure 2:
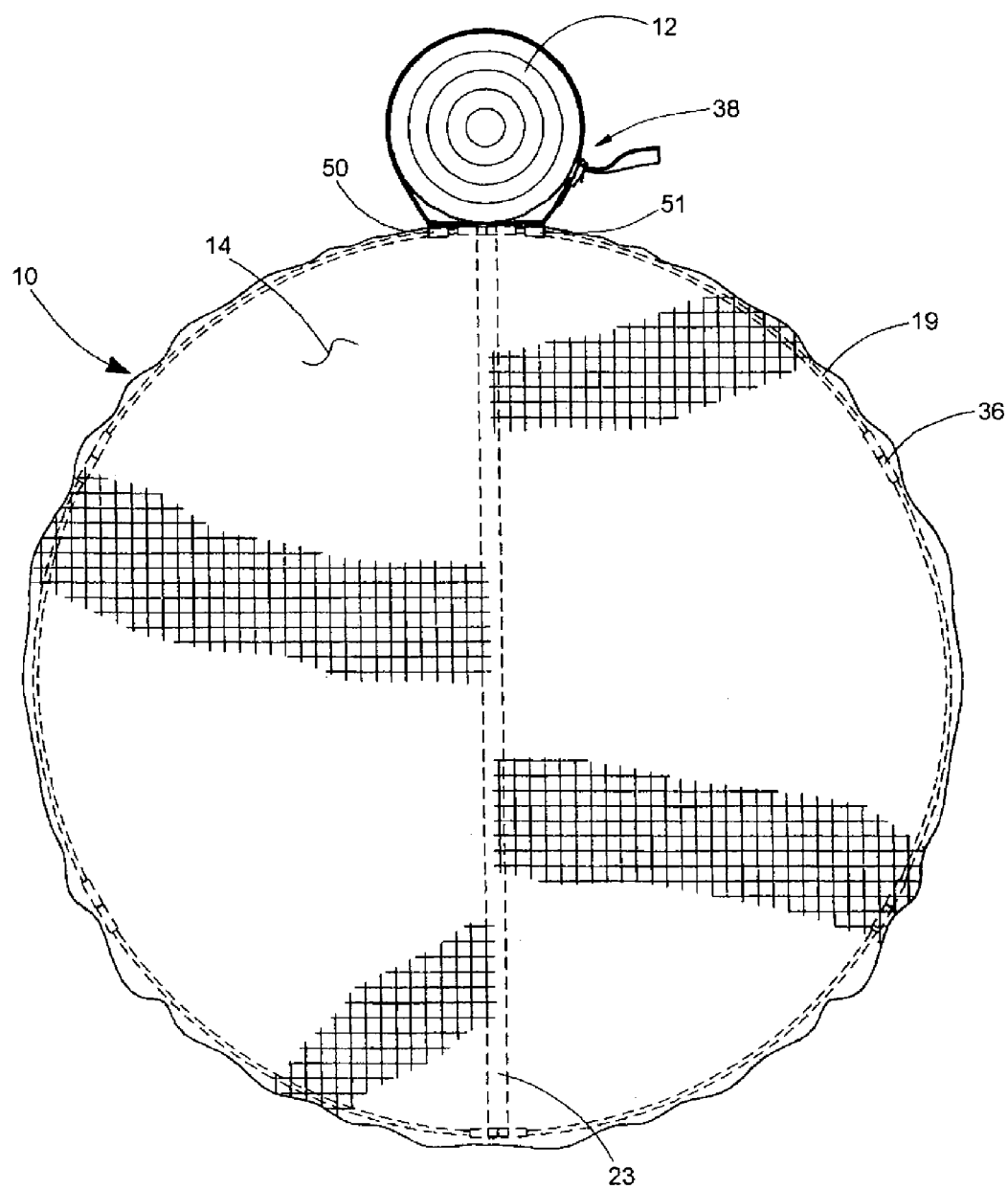
FIG. 2 is a top plan view of the blind of FIG. 1.

Referring to FIG. 2, the curtain 13 has a loop 30 sewn into a top edge 31 for receiving the support 19 therein. The loop 30 may be a single continuous loop extending along the top edge 31 or a plurality of spaced-apart loops 30. In the event that the loop 30 is a single continuous loop, a void in the loop 30 is positioned at a front of the blind 10 to allow the loop 24 of the attachment strap 23 to be secured to the support 19.

Figure 3:
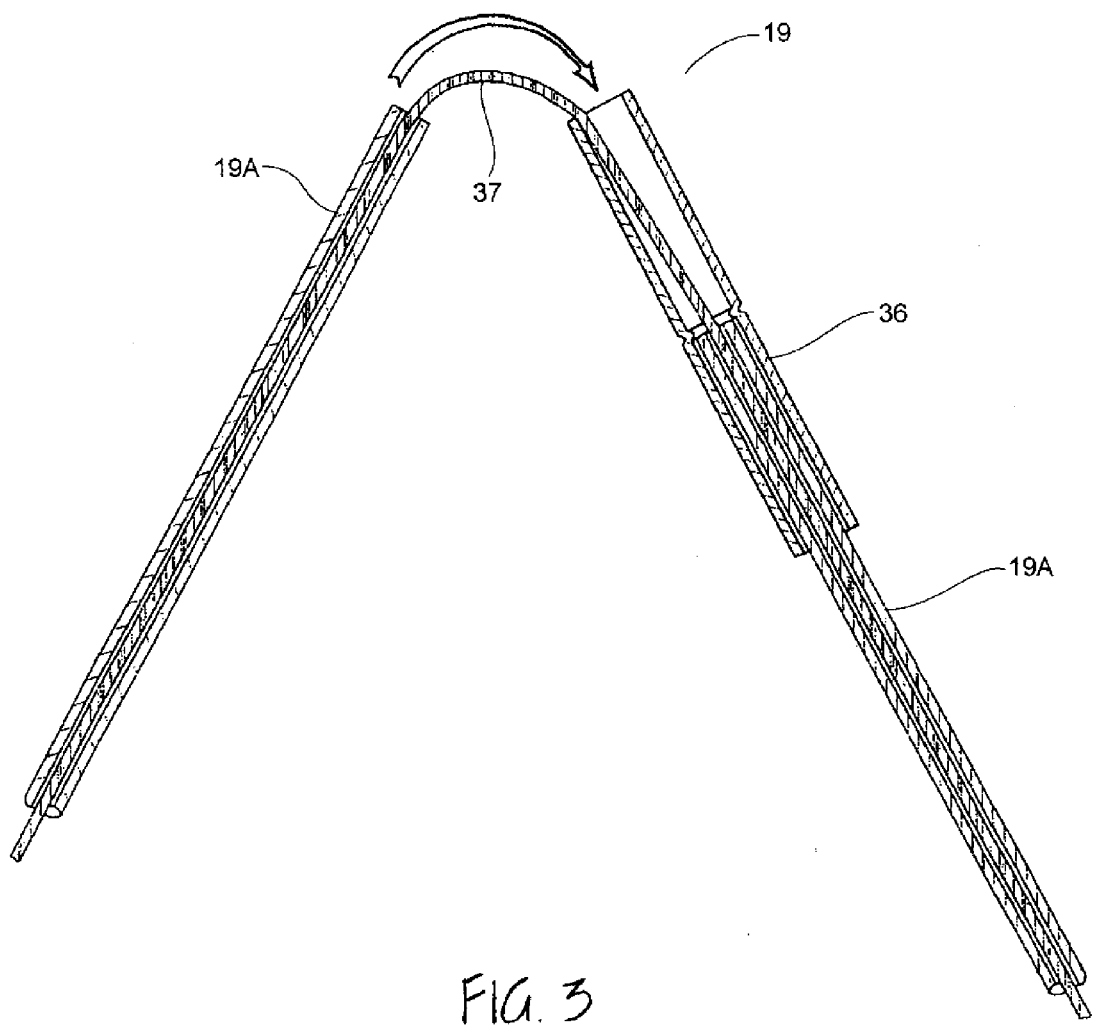
FIG. 3 is an exploded perspective view of a shock-cord tubing member of the blind of FIG. 1.

As shown in FIG. 3, the support 19 is formed using a plurality of support sections 19A. The support sections 19A may be made of any suitable material, such as fiberglass tubing, for forming a cylindrical frame and supporting the curtain 13. The support sections 19A are interconnected by a coupler 36. Each of the support sections 19A include a coupler 36 for permitting adjacent support sections 19A to be assembled in an end-to-end relation. A shock cord 37 is run through the support sections 19A and couplers 36 to maintain the support sections 19A in an assembled state, thereby forming the support 19. After the support 19 has been assembled, opposing ends of the support 19 are brought together and secured to form a cylindrical frame, as shown in FIG. 2.

Figure 4:
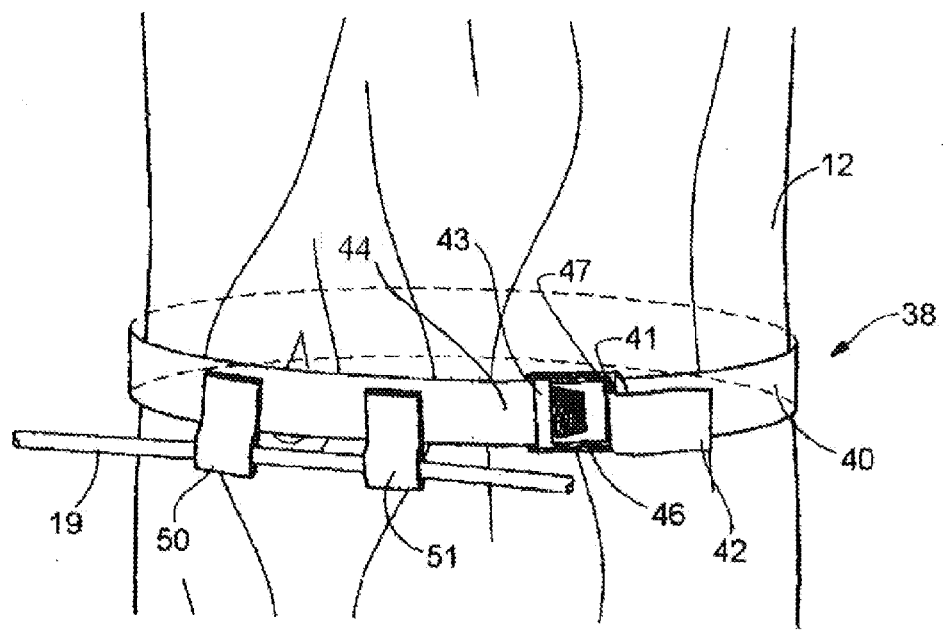
FIG. 4 is a perspective view of an upper connection mechanism of the blind of FIG. 1.

Referring to FIGS. 4 and 5, the blind 10 is secured to the tree 12 by securing strap 27 and securing strap 38. As illustrated in FIG. 4, the securing strap 38 includes an elongate strap 40, a male fastener 41 positioned on a first end 42 of the strap 40, a female fastener 43 positioned on a second end 44 of the strap 40, and a release mechanism 46 cooperating with the female fastener 43 to disengage the male fastener 41 from the female fastener 43, thereby releasing the strap 38 from the tree 12. The male fastener 41 also includes a slot 47 for allowing the first end 42 of the strap 40 to be pulled therethrough when tightening the securing strap 38 around the tree 12. The securing strap 38 also includes a pair of support loops 50 and 51 secured to the strap 40. The support loops 50 and 51 support a back of the support 19, and are spaced in such a manner that when the securing strap 38 is pulled tight, the loops impede horizontal and vertical movement.

As illustrated in FIG. 5, the securing strap 27 includes an elongate strap 52, a male fastener 53 positioned on a first end 54 of the strap 52, a female fastener 56 positioned on a second end 57 of the strap 52, and a release mechanism 58 cooperating with the female fastener 56 to disengage the male fastener 53 from the female fastener 56, thereby releasing the strap 27 from the tree 12. The male fastener 53 also includes a slot 60 for allowing the first end 54 of the strap 52 to be pulled therethrough when tightening the securing strap 27 around the tree 12. As shown, the loop 25 of the attachment strap 23 is secured to the securing strap 27 and extends to a front of the support 19. By using the attachment strap 23 and securing strap 27 to support the front of the support 19 and the securing strap 38 to support the back of the support 19, the support 19 can be supported in a substantially horizontal plane.

In operation, the blind 10 is used by first assembling the support 19 such that the support sections 19A are connected in an end-to-end fashion. Once the support 19 has been assembled, the support 19 is passed through the loop 30 until a first end of the support 19 reaches the void in the front of the curtain 13. The loop 24 of the attachment strap 23 is then slid over the support 19, thereby attaching the attachment strap 23 to the support 19. The support 19 is then passed through the remaining portion of the loop 30 until the curtain 13 is completely supported by the support 19. Securing strap 38 is then positioned on one of the free ends of the support 19 by sliding the loops 50 and 51 over the support 19.

The cylindrical frame is then formed by bringing the two free ends of the support 19 together. Once the cylindrical frame has been formed, the securing strap 38 is secured to the tree 12, as shown in FIGS. 2 and 4. Securing strap 27 is then slid through loop 25 of the attachment strap 23, so that the attachment strap can be secured to the tree 12. Once the securing strap 27 has been received by the loop 25, the securing strap is positioned at a height on the tree 12 to bring the support 19 into a substantially horizontal position and position the attachment strap 23 at a angle relative to the support to provide a pitch for the roof 14. Thus, adjustment of the height of the securing strap 27 changes the pitch of the roof 14 and the position of the support 19.

The curtain 13 is then moved along the support 19 to form an enclosure. Ties 18 are used to connect the ends of the curtain 13. The roof 14 is then stretched over the attachment strap 23 and the support 19 such that the roof 14 can be attached to the top edge 31 of the curtain 13.

A blind is described above. Various details of the invention may be changed without departing from its scope. Furthermore, the foregoing description of the preferred embodiments of the invention and best mode for practicing the invention are provided for the purpose of illustration only and not for the purpose of limitation.

I claim:

1. A blind for concealing an individual in an elevated location, comprising:

(a) a support adapted to be formed into an annular frame;
   (b) a curtain suspended from the support and adapted to surround the individual;
   (c) a first securing device connected to a rear of the support for securing the rear of the support to an upright object at a first height, wherein the first securing devices includes a pair of outwardly facing spaced apart loops for receiving therethrough the annular frame;
   (d) a flexible roof adapted to be positioned above a top edge of the curtain;
   (e) a single attachment strap positioned beneath the roof and having a first end directly connected to the support most remote from the upright object by a loop on the first end of the attachment strap and extending diagonally upwardly therefrom to the upright object;
   (f) a second securing device connected to a second end of the attachment strap for securing the second end of the attachment strap to the upright object at a second height greater than the first height, and
   (g) wherein the first securing device, second securing device, and attachment strap maintain the support in a generally horizontal position in relation to the upright object and the attachment strap is for forming a roof pitch line that stretches the flexible roof into a taut condition.

2. The blind according to claim 1, wherein the support includes:(a) a plurality of support sections connected to each other in an end-to-end configuration by respective couplers; and(b) an elastic cord running through the support sections to maintain the plurality of support sections in the end-to-end configuration.

3. The blind according to claim 1, wherein the curtain includes an elongate loop along a top edge of the curtain for receiving the support therethrough.

4. The blind according to claim 1, wherein the curtain includes at least one window formed in an upper portion of the curtain.

5. The blind according to claim 4, wherein the at least one window includes a flap adapted to move from a closed position to an open position.

* * * * *